United States Patent
Kaul et al.

(10) Patent No.: US 9,519,493 B2
(45) Date of Patent: Dec. 13, 2016

(54) POPULATING A CLIENT DEVICE WITH GRAPHICAL IMAGES SPECIFIC TO A MACHINE

(71) Applicant: Red Hat Israel, Ltd., Raanana (IL)

(72) Inventors: Yaniv Kaul, Raanana (IL); Uri Lublin, Raanana (IL)

( * ) Notice: Subject to any disclaimer, the term of this patent is extended or adjusted under 35 U.S.C. 154(b) by 415 days.

(21) Appl. No.: 13/666,203

(22) Filed: Nov. 1, 2012

(65) Prior Publication Data
US 2014/0122659 A1    May 1, 2014

(51) Int. Cl.
*G06F 15/167* (2006.01)
*G06F 9/44* (2006.01)

(52) U.S. Cl.
CPC .................................. *G06F 9/4445* (2013.01)

(58) Field of Classification Search
CPC ............ G06F 17/30902; G06F 12/0862; G06F 12/0866; G06F 9/4445
USPC ........................................................ 709/219
See application file for complete search history.

(56) References Cited

U.S. PATENT DOCUMENTS

| | | | |
|---|---|---|---|
| 2004/0153823 A1* | 8/2004 | Ansari | 714/38 |
| 2007/0234302 A1* | 10/2007 | Suzuki et al. | 717/126 |
| 2010/0115022 A1* | 5/2010 | Rapo | A63F 13/12 709/203 |
| 2010/0250725 A1* | 9/2010 | Meenan et al. | 709/223 |
| 2010/0329572 A1* | 12/2010 | Kamay et al. | 382/209 |

* cited by examiner

*Primary Examiner* — Oleg Survillo
*Assistant Examiner* — Tan Doan (57) ABSTRACT

A mechanism for populating a client device with graphical images specific to a machine is disclosed. A method includes storing a repository of graphical images associated with virtual machines (VMs), wherein the repository of graphical images is stored at the computing device prior to a connection of the computing device to a virtual machine (VM), connecting with a VM that is hosted by a host machine separate from the computing device and rendered in a graphical user interface (GUI) of the computing device, receiving hints regarding a configuration of the VM, and extracting one or more of the graphical images from the stored repository of graphical images that satisfy the received hints.

17 Claims, 4 Drawing Sheets

```
┌─────────────────────────────────────────────────────────────┐
│ Prior to connection to a virtual machine (VM), receive      │
│ repository of graphical images                              │
│                                                         210 │
└─────────────────────────────────────────────────────────────┘
                              │
                              ▼
┌─────────────────────────────────────────────────────────────┐
│ Store repository of graphical images at client device       │
│                                                         220 │
└─────────────────────────────────────────────────────────────┘
                              │
                              ▼
┌─────────────────────────────────────────────────────────────┐
│ Connect with the VM                                         │
│                                                         230 │
└─────────────────────────────────────────────────────────────┘
                              │
                              ▼
┌─────────────────────────────────────────────────────────────┐
│ Receive hints regarding configuration of VM                 │
│                                                         240 │
└─────────────────────────────────────────────────────────────┘
                              │
                              ▼
┌─────────────────────────────────────────────────────────────┐
│ Extract graphical images from the stored repository of      │
│ graphical images on the client device that satisfy the      │
│ received hints                                              │
│                                                         250 │
└─────────────────────────────────────────────────────────────┘
                              │
                              ▼
┌─────────────────────────────────────────────────────────────┐
│ Negotiate, with the VM, algorithm for generating unique IDs │
│ of graphical images                                         │
│                                                         260 │
└─────────────────────────────────────────────────────────────┘
                              │
                              ▼
┌─────────────────────────────────────────────────────────────┐
│ Generate unique IDs of the extracted graphical images using │
│ negotiated algorithm                                        │
│                                                         270 │
└─────────────────────────────────────────────────────────────┘
                              │
                              ▼
┌─────────────────────────────────────────────────────────────┐
│ Send generated unique IDs to the VM                         │
│                                                         280 │
└─────────────────────────────────────────────────────────────┘
```

Provide image hints associated with VM to client device
310

Negotiate algorithm with client device for generating unique IDs of graphical images
320

Receive images unique IDs from the client device
330

Record image unique IDs in table of image hashes of VM
340

Determine that graphical image file is to be sent to client device
350

Generate unique ID of graphical image file using negotiated algorithm
360

Generated unique ID located in image hash table?
370

Yes → Send image unique ID to the client device
380

No → Send graphical image file to the client device and insert unique ID into table
390

POPULATING A CLIENT DEVICE WITH GRAPHICAL IMAGES SPECIFIC TO A MACHINE

TECHNICAL FIELD

The embodiments of the invention relate generally to virtualization system and, more specifically, relate to a mechanism for populating a client device with graphical images specific to a machine.

BACKGROUND

A virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a hypervisor manages allocation and virtualization of computer resources and performs context switching to cycle between various VMs.

A host machine (e.g., computer or server) is typically enabled to simultaneously run multiple VMs, where each VM may be accessed and/or connected from a local or remote client. The host machine allocates a certain amount of the host's resources to each of the VMs. Each VM is then able to use the allocated resources to execute applications, including operating systems known as guest operating systems. The hypervisor virtualizes the underlying hardware of the host machine or emulates hardware devices.

In a virtualized data center, clients may connect to VMs using a remote access protocol, such as Virtual Network Computing (VNC), Remote Desktop Protocol (RDP), Independent Computing Architecture (ICA), or Simple Protocol for Independent Computing Environments (SPICE). The remote access protocol provides client access to a remote machine display and devices (e.g., keyboard, mouse, audio) to allow the user to experience a similar interaction as with a local machine.

In remote communication connections, such as in the above-described virtualization topology, sending images remotely from a VM to a client device can be costly in terms of bandwidth and latency. If an image associated with a VM is transferred slowly at the client device displaying the VM, the end user of the VM notices such a performance slow down and may be disappointed.

To improve the experience, remote access protocols may utilize a cache of images, which are stored in the client device's memory. The images may be identified by a unique identifier (ID), such as a hash, which is generated by the VM and/or the hypervisor at the host machine. The image itself, along with its unique ID, is passed to the client device the first time this image is seen by the VM. Consequently, when the same image is to be sent from the VM to the client device, the VM sends along with the unique ID of the image without the image itself. Typically, when a client device first loads, there are no images associated with the VM, and, as a result, an entire image file is sent to the client device anytime an image is loaded by the VM for the first time.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for populating a client device with graphical images specific to a machine. A method of embodiments of the invention includes storing a repository of graphical images associated with virtual machines (VMs), wherein the repository of graphical images is stored at the computing device prior to a connection of the computing device to a virtual machine (VM), connecting with a VM that is hosted by a host machine separate from the computing device and rendered in a graphical user interface (GUI) of the computing device, receiving hints regarding a configuration of the VM, and extracting one or more of the graphical images from the stored repository of graphical images that satisfy the received hints.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide a mechanism for populating a client device with graphical images specific to a machine. Remote access protocol components utilize a cache of graphical images, which are stored in a client device's memory and/or disk space, to improve a VM-to-client device communication session in embodiments of the invention. Prior to connecting to a VM, the memory and/or disk space of the client device is loaded with graphical images associated with the VM, and optionally unique identifiers, such as hashes, of the graphical images. The graphical images and/or unique IDs may be taken from and/or provided from a repository of images/unique IDs grouped together for purposes of populating a client device prior to connection of the client device with a remote server, such as a VM. This repository may be created by scanning software files, such as office suites, desktop applications, wallpapers or the operating system of the VM.

In some embodiments, upon the client device connecting to the VM, the VM or another entity, such as a virtualization manager, may provide hints to the client device regarding a configuration of the VM. These hints may be utilized to select the graphical images and/or unique IDs stored at the client device that satisfy the provided hints. The client device may then select those graphical images that satisfy the hints from the VM images pre-populated on the client device. If the unique IDs are not already stored at the client device, then the client device may also generate unique IDs of the extracted graphical images to store in the client device memory and to provide to the VM. The VM may then use these unique IDs to determine whether an entire graphical image file, or just an ID (e.g., the generated unique ID) of the graphical image file, should be sent to the client device when loading a VM graphical image. In other embodiments, a remote access protocol server executing outside of the VM may be responsible for managing the graphical image cache for the VM and making a determination of whether to send an entire graphical image file or just a unique ID of the graphical image file.

Figure 1:
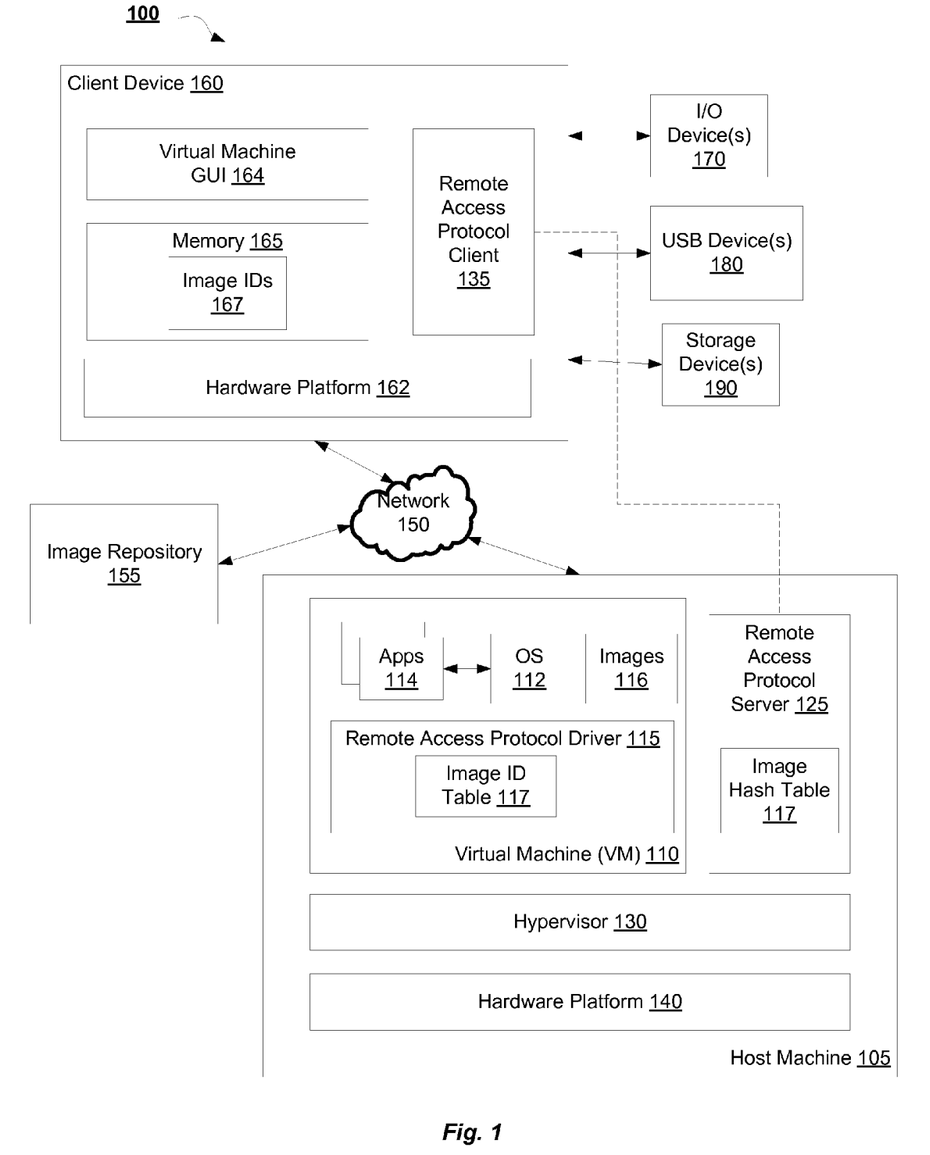
FIG. 1 is a block diagram of a virtualization system in which a client device is populated with graphical images specific to a VM in a virtualization system according to some embodiments of the invention.

FIG. 1 is a block diagram of a virtualization system 100 in which a client device is populated with graphical images specific to a VM in a virtualization system according to some embodiments of the invention. Referring to FIG. 1, system 100 includes, but is not limited to, a client device 160 communicatively coupled to a host machine 105 over a network 150. Network 150 may be a local area network (LAN) or a wide area network (WAN) and may be a combination of one or more networks. Each host machine 105 is configured to host one or more virtual machines. The host machine 105 may be coupled to a virtualization manager (not shown), via a network or directly, that manages VMs 110 hosted by the host machine 105. While a single VM 110 is illustrated, one skilled in the art will appreciated that host machine 105 may host multiple VMs 110. The virtualization manager may be configured to add a VM, delete a VM, balance the load on a cluster of host machines that includes the host machine 105, provide directory service to the VMs 110, and perform other management functions.

VM 110 may include one or more applications 114 executed and hosted by a guest operating system (OS) 112 within the VM 110. VM OS 112 and the VM 110 itself may be controlled by another operating system (not shown) of the host machine 105 that runs off of a hardware platform 140 of the host machine 105. Typically, a host OS may execute a hypervisor 130 (also referred to as a virtual machine monitor (VMM)) for monitoring the hosted VM 110. A guest OS 112 may be of the same or different type with respect to the host OS. For example, a guest OS 112 may be a Windows™ operating system from Microsoft™ and a host OS may be a Linux™ operating system available from Red Hat, Inc.™. In addition, the guest OSes 112 running on the different VMs 110 on the same host machine 105 may be of the same or different types.

VM 110 may be, for example, hardware emulation, full virtualization, paravirtualization, and operating system-level virtualization VMs. Different VMs 110 hosted by host machine 105 may have the same or different privilege levels for accessing different resources.

In one embodiment, VM 110 hosts or maintains a desktop environment providing virtual desktops for remote clients, including client device 160. A virtual desktop can represent an output, such as virtual machine graphical user interface (GUI) 164 (e.g., an image or UI to be displayed in order to represent the VM 110 at the client device 160), generated by a desktop application running within virtual machine 110. Graphics data associated with the virtual desktop can be captured and transmitted to client device 160, where the virtual machine GUI 164 (i.e., virtual desktop) may be rendered by a rendering agent and presented by a client application.

It should be noted that functionality provided to client device 160 by VM 110 is not limited to virtual desktops and may include a wide variety of other server-based virtualization functions made available to the clients. One skilled in the art will appreciate that embodiments of the invention may also be applicable beyond a virtualization topology to physical topologies as well. For example, embodiments of the invention may be applicable when remotely connecting to a physical machine. Although the present description is discussed in terms of virtualization, one skilled in the art will appreciate that other topologies may also be utilized.

In some embodiments, client-side resources also include a remote access protocol client 135 that is implemented to improve end-user experience of the virtual machine interface 164 associated with the virtual machine 110. In particular, a remote access protocol client 135 may work in tandem with a remote access protocol server 125 of the host machine 105 and a remote access protocol driver 115 of the VM 110 to determine a most efficient place to process graphics to maximize an end user experience and minimize system load. VM 110 may maintain connections with the remote rendering agent and/or the remote connection protocol agent via individual channels.

Client device 160 may further include end user devices, such as an input/output (I/O) device 170 (e.g., a display, a keyboard, a mouse), a USB device 180, or a storage device 190, etc. In one embodiment, VM 110 communicates with a remote access protocol server 125 using a multi-channel protocol (e.g., Remote Desktop Protocol (RDP™), Simple Protocol for Independent Computing Environments (SPICE™ from Red Hat, etc.) that allows for connection between VM 110 and end-user devices 170-190 of the host machine via remote access protocol client 135 executing on client device 160. The VM 110 may include a virtual device (e.g., using a virtual device drivers) or a paravirtual device (e.g., using a paravirtual device driver) for each end user device 170-190 to allow the VM 110 access to control and management functions of the end user devices 170-190. One example of a virtual device includes a virtual network interface controller (NIC) device (e.g., rt18139) and one example of a paravirtual device includes a paravirtual NIC device (e.g., a virtio network device).

Embodiments of the invention utilize the remote access protocol components 115, 125, 135 to pre-populate memory 165 of the client device with graphical images specific to VM 110. A graphical image specific to a VM is an image generated or otherwise provided by the VM or on behalf of the VM to a client for display on the client's monitor (as opposed to a VM disk image that is not intended for display on the client monitor). For purposes of the following description, any reference to images generally refers to graphical images.

When sending a graphical image to the client device 160 for display in the VM GUI 164, the remote access protocol driver 115 generates a unique ID, such as a hash, for the graphical image 116 and then checks the generated unique ID against a table of image IDs 117 maintained by the remote access protocol driver 115. If the table of image IDs 117 indicates that the graphical image has already been sent (e.g., the unique ID of the graphical image is found in the table of image IDs 117), then the remote access protocol driver 115 sends the unique ID of the graphical image to the client device 160. The client device 160 may use this unique ID to locate a copy of the graphical image in the client device memory 165 for use by the client device 160 in rendering the VM GUI 164. On the other hand, if the unique ID is not found in the table of image IDs 117, the remote access protocol driver 115 sends the entire graphical image file to the client device 160 and inserts the unique ID into the table of image IDs 117. Upon receiving the image, the client device 160 uses the graphical image and stores it in the client memory 165, along with a unique ID (e.g., a hash) of the graphical image.

Although embodiments of the invention specifically reference transfer of graphical images from VM to client device, embodiments of the invention also include the host machine 105 maintaining and sending the graphical images to the client device 160. In some embodiments, the remote access protocol server 125 may perform the functions described as performed by the remove access protocol driver 115, such as maintaining a table of image IDs 117 (also shown in FIG. 1 in the remote access protocol server 125) and determining whether a graphic image ID or the graphic image file itself should be sent to the client device 160.

Embodiments of the invention improve the VM 110-to-client device 160 connection by preventing the sending of entire graphical image files the first time a graphical image is loaded by a VM 110. To accomplish this, the client device 160 may be pre-populated with graphical images associated with the VM by loading the VM graphical images into the client device memory 165 and or disk space before the client device 160 connects to the VM 110. Specifically, VM graphical images may be stored on disk space and/or memory 165 of the client device 160, and unique IDs 167 of the graphical images may be stored in memory 165 of the client device 160. In some embodiments, VM graphical images may be stored remote from the client device 160 in storage that is accessible via a local access network (LAN), for example Network File System (NFS). In one embodiment, such remote storage of VM images may be public and/or shared storage that is accessible by a plurality of other client devices 160.

In some embodiments, the graphical images may be taken from a repository 155 of pre-made images. In one embodiment, the repository is externally located to the host machine 105 and the client device 160. In other embodiments, the repository 155 may be part of the host machine 105. The repository 155 is prepared in advance of initialization of the VM 110 and connection between the VM 110 and client device 160. The repository 155 may be created by scanning software files (such as office suites, desktop applications, wallpapers, VM images, or the operating system of the VM). The scan extracts the graphical images, generates unique IDs for each of the images, and populates the repository 155. In one embodiment, the repository 155 is a read-only repository and can be shared between multiple client devices 160, thus increasing efficiency of the VM 110-to-client device 160 connection. In some embodiments, an administrator of the virtualization system and/or of the VM 110 may be responsible for creating the repository 155 of images. The repository 155, or at least a portion of the repository 155, may be transferred to the client device 160 at any point in time and can be transferred prior to any connections being made with the VM 110.

In one embodiment, the unique IDs of the graphical images are already calculated and included with the graphical images in the image repository 155. In another embodiment, unique IDs of the graphical images are generated by the remote access protocol client 135 at the client device 160 upon an initial connection to the VM 110. In a further embodiment, the host machine 105 can pre-load the repository 155 of graphical images 155 and/or a matching repository that contains the image IDs. In this case, the host machine 105 and client device 160 may negotiate which repositories to use and the client device 160 does not have to send all the unique IDs to the host machine 105 after it loads the repository 155.

In one embodiment, the remote access protocol driver 115 on the VM 110 provides hints to the remote access protocol client 135 regarding the OS and application that are run on the VM 110. In other embodiments, an entity other than the remote access protocol driver 115, such as the remote access protocol server 125 or a virtualization manager (not shown) managing the host machine 105 and VMs 110, may provide the hints. The remote access protocol client 135 may then utilize these hints to select the graphical images stored at the client device 160 that satisfy the provided hints. For example, the remote access protocol driver 115 may indicate that VM 110 is configured with a Linux™ OS and OpenOffice™ suite applications. The remote access protocol client 135 then selects the graphical images associated with these programs from the VM graphical images pre-populated on the client device 160. In other embodiments, the hint may indicate a specific template image used by the VM 110. In this example, the remote access protocol client 135 can select all graphical images associated with that specific VM template image.

The remote access protocol client 135 may then generate unique IDs 167 of these graphical images to store in the client device memory 165 and also to provide to the remote access protocol driver 115 of the VM 110. In one embodiment, a hashing algorithm that is used to generate the graphical image unique IDs 167 may be negotiated between the VM 110 and the client device 160 upon connection of the VM 110 and client device 160. In another embodiment, the remote access protocol server 125 also loads the unique IDs into a cache of the remote access protocol server 125 from a matching repository of graphical images/IDs (or possible from the same repository as the client device obtained the images/IDs, if the client device and the remote access protocol server 125 are on the same LAN). In this case, the remote access protocol client 135 does not send the unique IDs to the host machine, as the IDs are also loaded at the host machine 105. Furthermore, the remote access protocol server 125 and the remote access protocol client 135 should negotiate which pre-made caches are used when a communication session is established (e.g., using hints, etc.).

The remote access protocol driver 115 may then record the unique IDs received from the remote access protocol client 135 in the table of image IDs 117. As a result, when an graphical image is loaded at the VM 110 for the first time, the unique ID of the graphical image may be found in the table of image IDs 117 so that the entire graphical image does not have to be sent to the client device 160 (assuming said graphical image is one that is pre-loaded at the client device 160).

Figure 2:
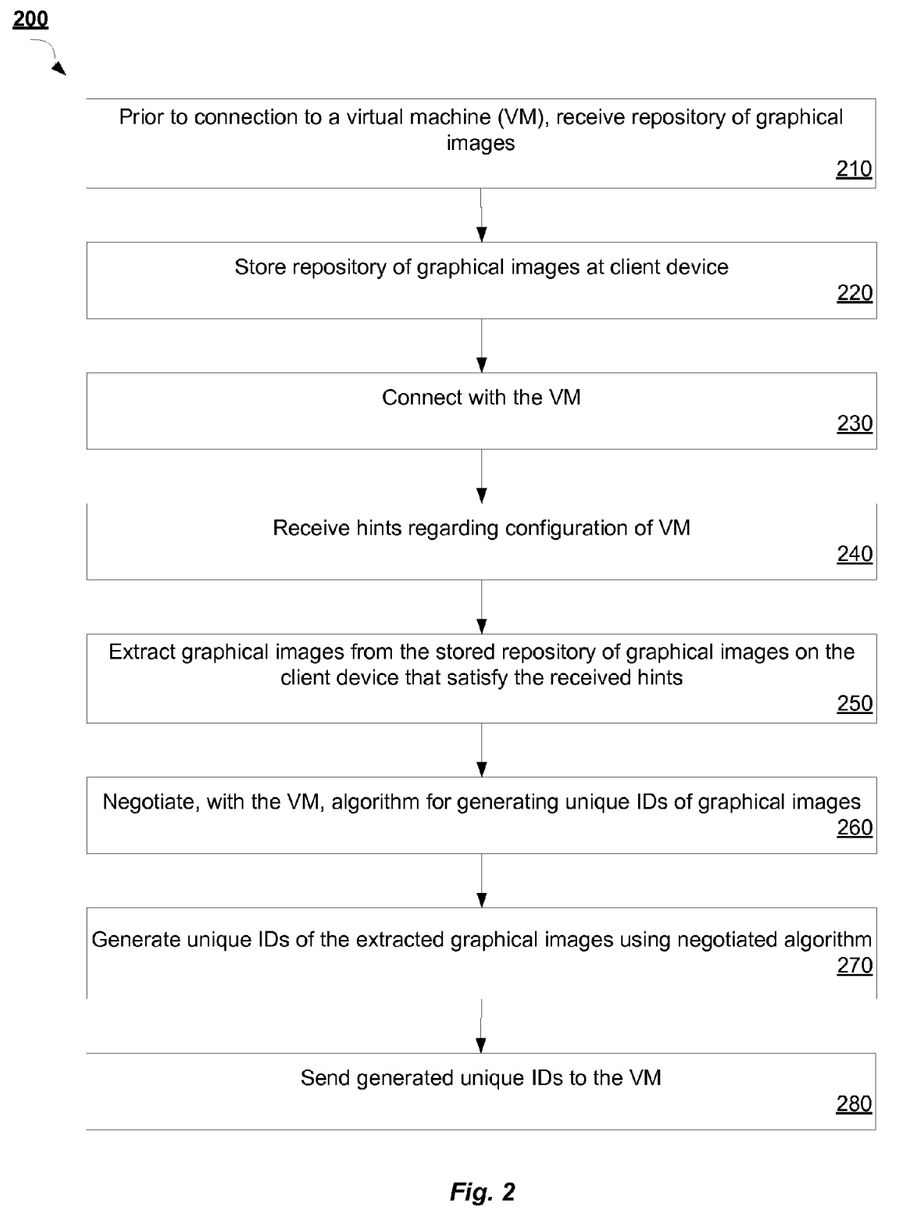
FIG. 2 is a flow diagram illustrating a method for populating a client device with graphical images specific to a virtual machine according to an embodiment of the invention.

FIG. 2 is a flow diagram illustrating a method 200 for populating a client device with graphical images specific to a virtual machine according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by remote access protocol client 135 of client device 160 of FIG. 1.

Method 200 begins at block 210 where a repository of graphical images is received. The repository 155 is prepared in advance of initialization of the VM 110 and connection between the VM 110 and client device 160. In one embodiment, the repository of graphical images is accessed by the remote access protocol client and the graphical images pulled from the repository are then saved at the client device. In other embodiments, the repository of graphical images is sent to the remote access protocol client for storage at the client device. In one embodiment, an administrator of the VM or of the virtualization system may direct the repository to be sent to the client device. In another embodiment, the remote access protocol server at the host machine may cause the repository to be sent to the client device. The repository may be created by scanning software files (such as office suites, desktop applications, wallpapers, VM images, or the operating system of the VM) for graphical images and extracting the identified graphical images to populate the repository. In some embodiments, an administrator of the virtualization system and/or of the VM may be responsible for creating the repository.

At block 220, the repository of graphical images is saved in the client device. In one embodiment, the graphical images are stored in disk space or memory of the client device, or a combination of both. In other embodiments, the graphical images are saved in a remotely-accessible storage device associated with the client device, such as shared/public storage access via a LAN by the client device. At block 230, a connection with a VM is created. Then, at block 240, hints regarding a configuration of the VM are received. In some embodiments, the hints include OS and application configuration information of the VM. In other embodiments, the hints may include a VM image template used to initialize the VM. One skilled in the art will appreciate that any variety and/or combination of hints may be provided by the VM. In further embodiments, the hints are received at the client device prior to connecting to the VM. In some embodiments, blocks 210 and 220 are not performed for every connection.

At block 250, graphical images that satisfy the received hints are extracted from the stored image repository on/associated with the client device. In one embodiment, metadata associated with the stored graphical images may assist in identifying those graphical images that correlate to the provided hints. Then, at block 260, an algorithm is negotiated with the VM for generating unique IDs of the graphical images. In one embodiment, the algorithm may be a hashing algorithm. At block 270, unique IDs of the extracted graphical images are generated using the negotiated algorithm. Lastly, at block 280, the generated unique IDs are sent to the VM.

Figure 3:
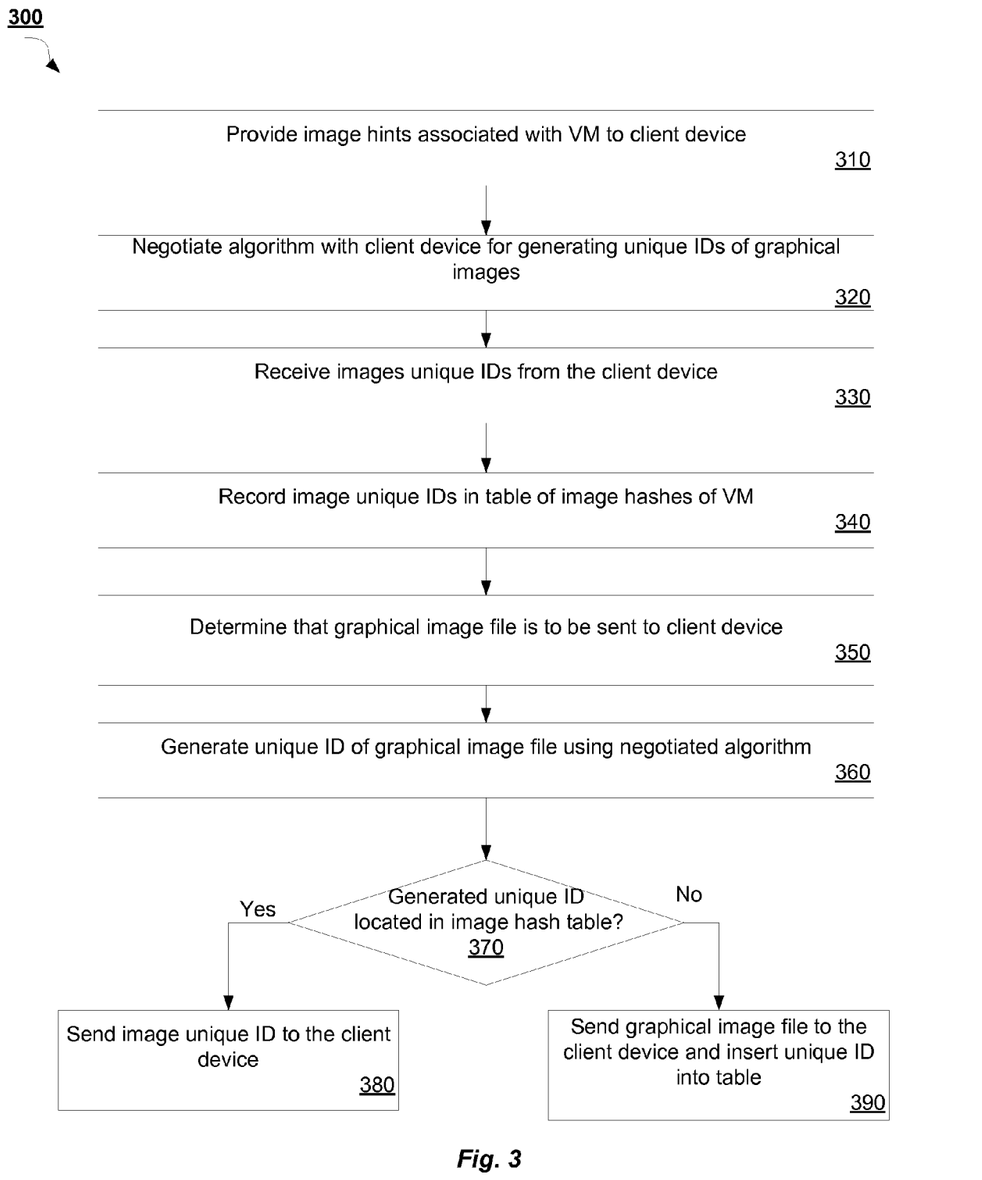
FIG. 3 is a flow diagram illustrating a method for efficient image transfer with a client device populated with graphical images specific to a virtual machine according to an embodiment of the invention.

FIG. 3 is a flow diagram illustrating a method 300 for efficient graphical image transfer with a client device populated with graphical images specific to a VM according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by remote access protocol driver 115 of VM 110 of FIG. 1. In another embodiment, method 300 is performed by remote access protocol server 125 of host machine 105 of FIG. 1.

Method 300 begins at block 310 where image hints associated with a VM of the remote access protocol driver are provided to a client device. In one embodiment, the image hints are provided upon initial connection of the VM to the client device. In one embodiment, the hints include OS and application configuration information of the VM. In other embodiments, the hints may include a VM image template used to initialize the VM. Then, at block 320, an algorithm is negotiated with the client device to generate unique IDs for graphical images. In one embodiment, the algorithm is a hashing algorithm. At block 330, graphical image unique IDs are received from the client device, and in particular, from the remote access protocol client of the client device.

At block 340, the received image unique IDs are recorded in a table of image IDs maintained by the remote access protocol driver of the VM. Then, at block 350, the remote access protocol driver determines that a graphical image file is to be sent from the VM to the client device. At block 360, a unique ID of the graphical image file is generated using the negotiated algorithm. In one embodiment, the unique ID is a hash of the graphical image file.

Subsequently, at decision block 370, it is determined whether the generated unique ID is located in the table of image IDs. If so, then the image unique ID of the graphical image file is sent to the client device without sending the entire image file at block 380. On the other hand, if the generated unique ID is not located in the table of image IDs, then method 300 proceeds to block 390, where the entire graphical image file is sent to the client device along with its unique ID. The unique ID is then inserted into the table of image IDs.

Figure 4:
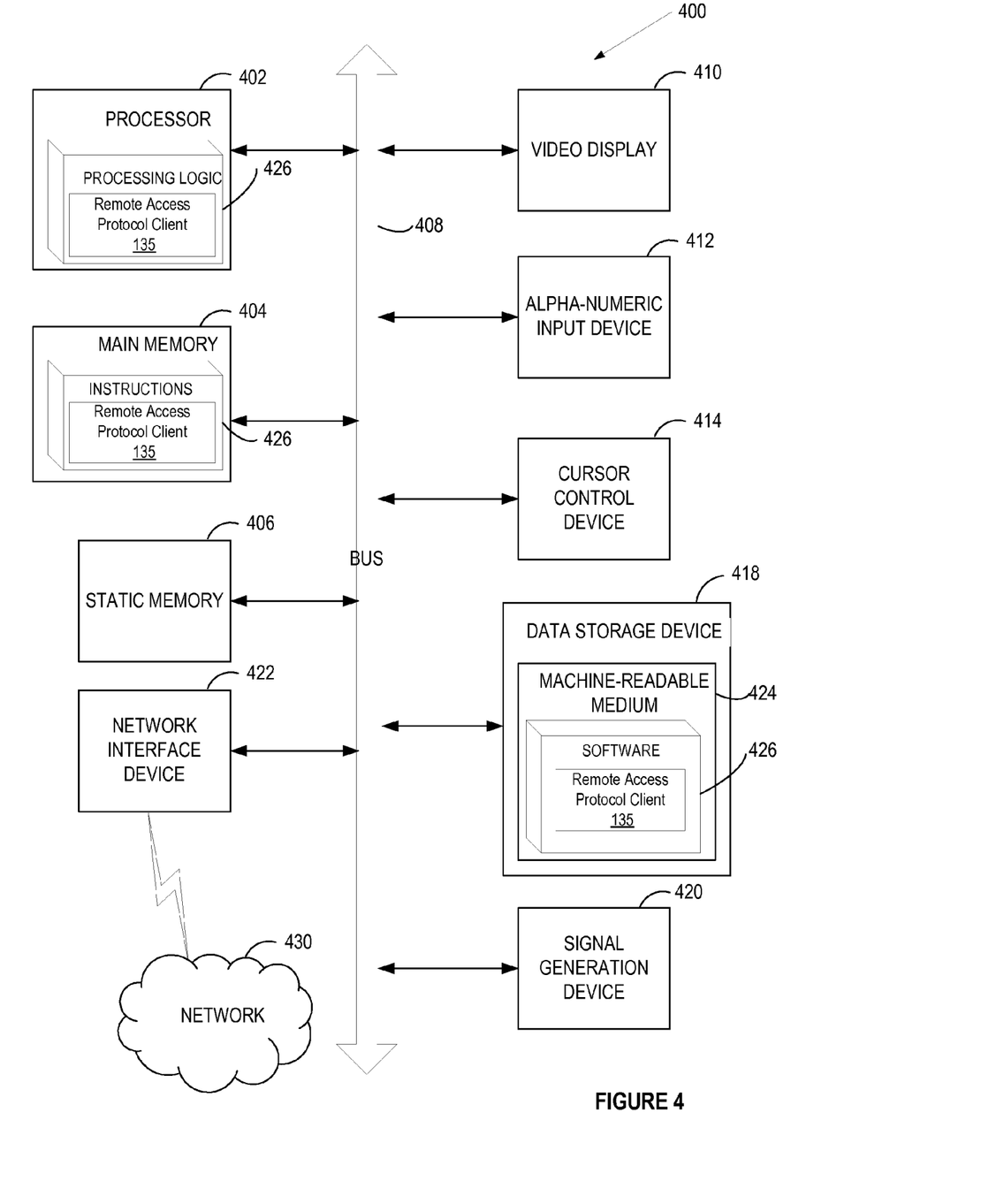
FIG. 4 illustrates a block diagram of one embodiment of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein, illustrated in FIG. 4 by depicting instructions 426 within processor 402.

The computer system 400 may further include a network interface device 422. The computer system 400 also may include a video display unit 410 (e.g., a liquid crystal display (LCD), a cathode ray tube (CRT), or a touchscreen), an alphanumeric input device 412 (e.g., a keyboard), a cursor control device 414 (e.g., a mouse), and a signal generation device 420 (e.g., a speaker).

The data storage device 418 may include a machine-readable storage medium 424 (also known as a computer-readable storage medium) on which is stored software 426 (e.g., one or more sets of instructions, software, etc.) embodying any one or more of the methodologies or functions described herein. The software 426 may also reside, completely or at least partially, within the main memory 404 (e.g., instructions 426) and/or within the processor 402 (e.g., processing logic 426) during execution thereof by the computer system 400, the main memory 404 and the processor 402 also constituting machine-readable storage media. The software 426 may further be transmitted or received over a network 430 via the network interface device 422.

In one embodiment, the software 426 include instructions for a remote access protocol client 135, which may correspond to remote access protocol client 135 of FIG. 3, and/or a software library containing methods that call the remote access protocol client 135 for populating a client device with images specific to a VM. While the machine-readable storage medium 424 is shown in an example embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "sending", "receiving", "attaching", "forwarding", "caching", "storing", "extracting", "connecting", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
    receiving, by a processing device of a client computing device, prior to initializing a virtual machine (VM) on a host machine that is coupled to the client computing device, a repository of graphical images of applications to be displayed on a monitor of the client computing device, wherein the repository of graphical images to be displayed on the monitor of the client computing device is generated by scanning software files of the applications and is stored at the client computing device prior to the client computing device connecting to the VM;

connecting, by the processing device of the client computing device, with the VM on the host machine;

receiving, by the processing device of the client computing device, hints regarding a configuration of the VM;

selecting, by the processing device, one or more of the graphical images from the repository of images that satisfy the hints;

generating, by the processing device of the client computing device, identifiers for the one or more of the graphical images that satisfy the hints; and sending, by the processing device of the client computing device, the identifiers for the one or more of the graphical images that satisfy the hints to the VM.

2. The method of claim 1, wherein the client computing device comprises a remote access protocol client to perform the connecting, the receiving, the selecting, the generating, and the sending.

3. The method of claim 1, further comprising negotiating a hash generator with the VM, the negotiated hash generator used to generate the identifiers.

4. The method of claim 1, wherein the repository of graphical images is created by extracting graphical images identified in the scanning to populate the repository, the software files pertaining to at least one of an office suite of the VM, a desktop application of the VM, wallpaper of the VM, or operating system of the VM.

5. The method of claim 1, wherein connecting with the VM is performed subsequent to receiving the hints.

6. The method of claim 1, wherein identifiers (IDs) of the extracted graphical images are recorded by the host machine in a table of image IDs, and the table of image IDs are referenced by the host machine when loading a graphical image file for the VM to determine whether an ID of the graphical image file or the graphical image file itself is to be sent to the client computing device.

7. The method of claim 6, wherein when the table of image IDs comprises the ID of the graphical image file, the ID of the graphical image file is sent to the client computing device without sending the corresponding graphical image file to the client computing device, and wherein when the table of image IDs does not comprise the ID of the graphical image file, the graphical image file is sent to the client computing device.

8. A client computing device, comprising:

a memory storing a repository of graphical images of application to be displayed on a monitor of the client computing device, wherein the repository of graphical images to be displayed on the monitor of the client computing device is generated by a scan of software files of the applications and is stored in the memory prior to the client computing device connecting to the virtual machine; and a processing device coupled to the memory, the processing device configured to:

receive the repository of graphical images prior to initializing a virtual machine (VM) on a host machine that is coupled to the client computing device;

connect with the VM on a host machine;

receive hints regarding a configuration of the VM;

select one or more of the graphical images from the repository of images that satisfy the hints;

generate identifiers for the one or more of the graphical images that satisfy the hints; and send the identifiers for the one or more of the graphical images that satisfy the hints to the VM.

9. The system of claim 8, wherein the processing device is further configured to:

negotiate a hash generator with the VM, the negotiated hash generator used to generate the identifiers.

10. The system of claim 8, wherein the repository of graphical images is created by extracting graphical images identified in the scan to populate the repository, the software files pertaining to at least one of an office suite of the VM, a desktop application of the VM, wallpaper of the VM, or operating system of the VM.

11. The system of claim 8, wherein the processing device is configured to connect with the VM subsequent to the processing device receiving the hints.

12. The system of claim 8, wherein the identifiers (IDs) of the extracted graphical images are recorded by the host machine in a table of image IDs, and the table of image IDs are referenced by the host machine when loading a graphical image file for the VM to determine whether an ID of the graphical image file or the graphical image file itself is to be sent to the client computing device.

13. The system of claim 12, wherein when the table of image IDs comprises the ID of the graphical image file, the ID of the graphical image file is sent to the client computing device without sending the corresponding graphical image file to the client computing device, and wherein when the table of image IDs does not comprise the ID of the graphical image file, the graphical image file is sent to the client computing device.

14. A non-transitory machine-readable storage medium including instructions that, when accessed by a processing device of a client computing device, cause the processing device to:

receive, by the processing device, a repository of graphical images of applications to be displayed on a monitor of the client computing device, wherein the repository is generated by scanning software files of the applications and is stored at the client computing device prior to a connection of the client computing device to the VM;

connect, by the processing device, with the VM on the host machine;

receive, by the processing device, hints regarding a configuration of the VM;

select, by the processing device, one or more of the graphical images from the repository of images that satisfy the hints;

generate, by the processing device, identifiers for the one or more of the graphical images that satisfy the hints; and send, by the processing device, the identifiers for the one or more of the graphical images that satisfy the hints to the VM.

15. The non-transitory machine-readable storage medium of claim 14, wherein the processing device executes a remote access protocol client to connect with the VM, to receive the hints, to select the one or more graphical images, to generate the identifiers, and to send the identifiers.

16. The non-transitory machine-readable storage medium of claim 14, wherein the IDs are recorded in a table of image IDs of a remote access protocol driver of the host machine and the table of image IDs are referenced by the host machine when loading a graphical image file for the VM to determine whether an ID of the graphical image file or the graphical image file itself is to be sent to the client computing device.

17. The non-transitory machine-readable storage medium of claim 16, wherein when the table of image IDs comprises the ID of the graphical image file, the ID of the graphical image file is sent to the client computing device without sending the corresponding graphical image file to the client computing device; and when the table of image IDs does not comprise the ID of the graphical image file, the graphical image file is sent to the client computing device.

\* \* \* \* \*